United States Patent [19]

Polacsek

[11] 4,362,907
[45] Dec. 7, 1982

[54] COMBINATION AUTOMOBILE SUN VISOR AND RADIO AND SPEAKER ASSEMBLY

[76] Inventor: David D. Polacsek, 780 Oberlin Rd., Apt. 17, Elyria, Ohio 44035

[21] Appl. No.: 235,418

[22] Filed: Feb. 17, 1981

Related U.S. Application Data

[63] Continuation-in-part of Ser. No. 143,431, Apr. 24, 1980, Pat. No. 4,326,100.

[51] Int. Cl.³ .................. H04R 1/02; B60R 11/02
[52] U.S. Cl. .................. 179/1 VE; 179/146 E;
179/179
[58] Field of Search ........... 179/1 VE, 100 R, 146 R, 179/147, 178, 179, 146 E

[56] References Cited

U.S. PATENT DOCUMENTS

| | | | |
|---|---|---|---|
| 4,056,696 | 11/1977 | Meyerle et al. | 179/100 R |
| 4,169,218 | 9/1979 | Tyler | 179/100 R |
| 4,247,850 | 1/1981 | Marcus | 179/146 R |

FOREIGN PATENT DOCUMENTS

| | | | |
|---|---|---|---|
| 2053038 | 5/1972 | Fed. Rep. of Germany ... | 179/146 E |
| 671885 | 7/1962 | Italy .................. | 179/1 VE |

*Primary Examiner*—G. Z. Rubinson
*Assistant Examiner*—Randall P. Myers
*Attorney, Agent, or Firm*—Pearne, Gordon, Sessions, McCoy & Granger

[57] ABSTRACT

A combination automobile sun visor and radio and speaker assembly for use in automobiles and other motor vehicles, to be mounted above the windshield in place of a conventional sun visor. The assembly comprises a thin, flat, bidirectional speaker assembly enclosed within a layer of acoustically transparent material, a radio module having a tuner and amplifier mounted in the speaker assembly, and means for mounting the speaker assembly above the windshield. The radio and speaker assembly provides speaker placement which is superior to prior art automobile speakers and provides speakers which may be adjusted and which do not waste interior space.

14 Claims, 5 Drawing Figures

COMBINATION AUTOMOBILE SUN VISOR AND RADIO AND SPEAKER ASSEMBLY

CROSS-REFERENCE TO RELATED APPLICATION

This application is a continuation-in-part of application Ser. No. 143,431, filed Apr. 24, 1980 now U.S. Pat. No. 4,326,100.

BACKGROUND OF THE INVENTION

1. Field of the Invention

The invention relates to audio systems for use in motor vehicles, and specifically to radios and speakers used in automobiles.

2. Description of the Prior Art

In obtaining the best audio fidelity possible in radios and other sound systems, speakers play a crucial role, and several factors govern how well a speaker will perform. In automobiles and other motor vehicles, location becomes a particularly significant factor because of the impracticality or impossibility of moving the speakers once they have been installed and because of the limitations imposed by the physical dimensions of the interior of automobiles and other motor vehicles, especially with the growing popularity of smaller automobiles which have less interior room. These smaller cars also make it difficult to install a dash-mounted radio. Also, the conventional dashboard speakers have the disadvantages of being placed relatively low and misdirecting sound into the windshield, with the net result that audio fidelity is impaired. Similarly, conventional speakers installed on the rear compartment below the rear window are too far removed from the occupants of the front seat and misdirect sound into the rear window, which again loses and distorts sound. Door speakers are mounted too low and direct sound to the listener's legs. Door speakers also take up precious interior room or may require cutting into the door. Furthermore, door or dashboard speakers are typically fixed in position so that the sound cannot be redirected to various places in the automobile with the result than an automobile owner installing an audio system with such speakers will be limited to having good audio fidelity in only one area of the automobile.

Some movable speakers for automobiles have been developed. Clip-on speakers for sun visors or windows have been available in the past, but they have disadvantages. Clip-on window speakers typically are attached by a clip to the top of a window, requiring the window to be open, which is undesirable in inclement weather. Clip-on sun visor speakers which clip to the top of a sun visor expose wires and can be hazardous if they fall off, particularly on the driver's side. These speakers also extend outwardly from the sun visor and take up an excesive amount of room. Furthermore, such clip-on sun visor speakers are attached to only one side of the sun visor and, depending on the side to which they are attached, they may get jammed against the roof or against the windshield when the sun visor is moved to its horizontal or vertical position, dispersing all their output onto the roof or windshield, which renders them eventually nonfunctional.

SUMMARY OF THE INVENTION

The present invention solves these and other problems by providing a combination automobile sun visor and radio and speaker assembly comprising one or more thin, flat speakers enclosed within a layer of acoustically transparent material, combined with a radio tuner and amplifier, and mounted above the windshield in place of a conventional sun visor. This assembly performs the functions of a radio, an external speaker, and a sun visor, and provides an automobile audio system with the features of better audio fidelity and greater compactness.

A speaker assembly mounted above the windshield provides sound propagation radially downward, which provides superior audio reception to that of a speaker mounted below ear level. Furthermore, the invention incorporates the adjustability of a conventional sun visor which has two pivoting movements in order to adjust for shielding of eyes from the sun, one of which allows the sun visor to be tilted between a horizontal position and a vertical position and another of which allows for lateral rotation of the sun visor about its point of mounting. The invention, by enclosing the radio and speaker within the sun visor, incorporates this adjustment feature into the audio fidelity, with the result that sound can be substantially redirected to any place in the automobile by a proper combination of tilting and lateral rotation. This feature is novel and has advantages over prior art speaker systems. To this point, the automobile speaker assembly of this invention offers a substantial degree of capability for redirection of sound that was previously unattainable. The invention has a greater capability for redirection of sound than the speaker which clips on an existing sun visor, since, by enclosing the speaker within the sun visor, the invention makes it possible to use a bidirectional speaker, thus functioning even when jammed against the roof or the windshield.

The invention also furnishes compactness. By locating the radio and speaker within the sun visor, the assembly of the present invention does not take up as much room as the conventional sun visor that it replaces and avoids a dashboard-installed radio and intrusion of the speakers into the space occupied by a driver or passengers. It also provides closer and easier access of the tuning controls of the radio to the driver, and eliminates the need for taking up valuable dashboard space with a radio. The invention also provides an aesthetic advantage by having the radio and the speaker enclosed within the sun visor instead of cluttering up the dashboard. The invention further provides for wiring which may be run through the mounting means and down the interior support adjacent to the windshield, which minimizes the degree to which wiring is exposed, as well as minimizing visual clutter. Furthermore, by making the radio, speaker, and sun visor a single unit, the assembly may be more easily installed without ripping or cutting out portions of the interior upholstery.

These and other advantages are accomplished by the present invention of a combination automobile sun visor and radio and speaker assembly comprising a thin speaker assembly enclosed in a layer of acoustically transparent material, a radio module contained in the speaker assembly and enclosed in the material, the radio module having control knobs projecting through the material, mounting means comprising a pivotable sun visor mounting assembly, and wiring extending from the speaker assembly for connection to an external power source.

DESCRIPTION OF THE PREFERRED EMBODIMENT

Figure 1:
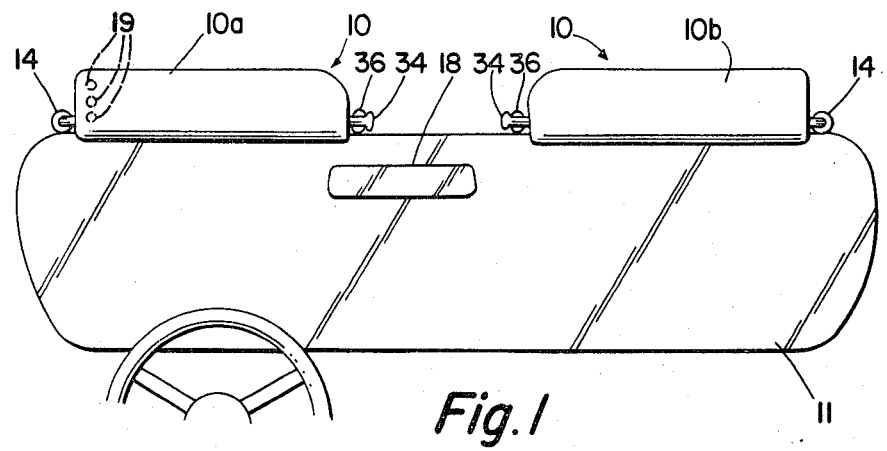
FIG. 1 is a view of an automobile interior looking forward and showing the radio and speaker assemblies mounted in place of conventional sun visors.

Referring initially to FIG. 1, the preferred embodiment of the invention comprises a pair of combination automobile sun visors and radio and speaker assemblies 10 located above the windshield 11 of an automobile, in the position of conventional sun visors. One radio and speaker assembly 10a is located above the driver's position, and the other speaker assembly 10b is located above the front seat passenger's position. Both radio and speaker assemblies 10a and 10b appear to be identical, except that the radio and speaker assembly 10a has knob controls for operation of the radio and the speaker assembly 10b is the mirror image of the speaker assembly 10a, so that they may be mounted symmetrically.

Figure 2:
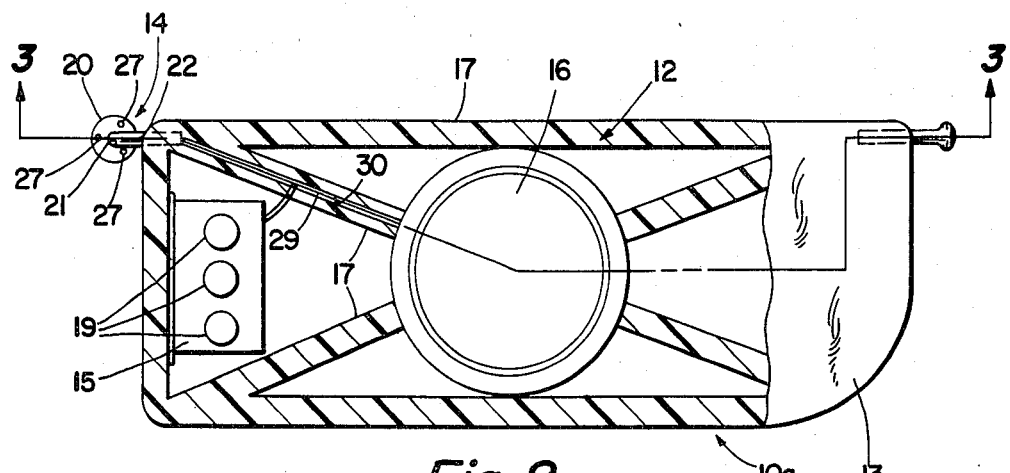
FIG. 2 is a detailed, elevational view of one of the radio and speaker assemblies of FIG. 1, lowered to its downward vertical position, with portions removed.

As depicted in FIG. 2, the radio and speaker assembly 10a comprises a thin, flat speaker 12 covered by a layer of acoustically transparent material 13, a radio module 15 having a radio tuner and amplifier, and a mounting means 14 which provides for mounting the assembly above the windshield 11 in the manner of a conventional sun visor.

Preferably, the speaker 12 is bidirectional and comprises a lightweight acoustic panel 16 supported by a frame 17 of compatible plastic material. The speaker 12 is constructed of expandable polystyrene and related plastics, providing thinness and lightness as well as a bidirectional polar output. The speaker 12 is available commercially in such forms as the Poly-Planar P-5B wafer-type speaker, available from Poly-Planar Division of Electronic Research Associates, Inc., Moonachie, New Jersey. The speaker 12 is preferably rounded at one corner to conform to the shape of a conventional sun visor and to provide clearance for the rear view mirror 18. The covering material 13 then can be chosen from any form of acoustically transparent material so as to match the automobile interior.

The radio module 15 is mounted within the frame 17 and covered by the material 13. The module 15 contains a tuner and amplifier similar to those used in conventional automobile radios. The module 15 has knobs 19 which project from the module through the material 13 to be accessible by the driver. The knobs 19 are used to control the radio volume and tuning.

Figure 3:
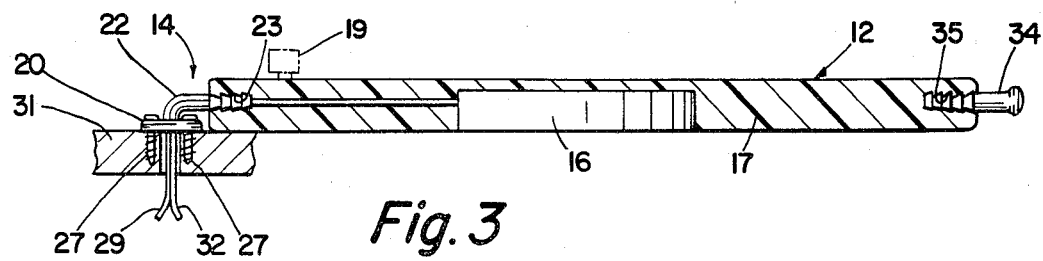
FIG. 3 is a sectional view taken along line 3—3 of FIG. 2.
Figure 4:
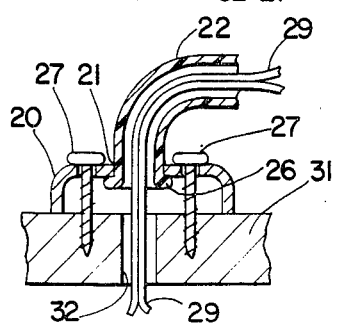
FIG. 4 is a detailed, sectional view of a portion of the mounting means of the radio and speaker assembly of FIG. 2.
Figure 5:
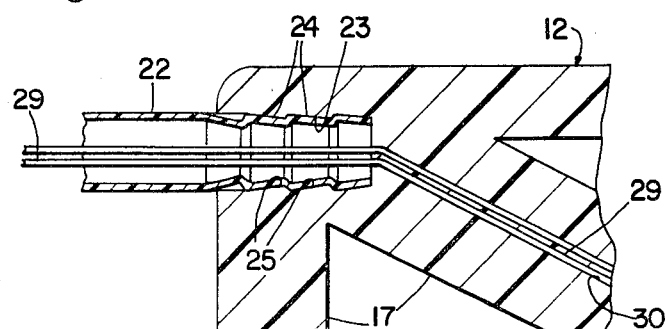
FIG. 5 is a detailed, sectional view of another portion of the mounting means of the radio and speaker assembly of FIG. 2.

The mounting means 14 comprises a small plate 20 having a central opening 21 and a short, hollow, L-shaped tubular shaft 22. A bore 23 is provided in the speaker 12 extending inwardly at one corner and having an inside dimension approximately the same or slightly smaller than the outside dimension of one end of the shaft 22, which is provided with annular knurls or ridges 24 to make a tight fit in the bore. The series of raised ridges 24 engage a corresponding series of annular indentations 25 along the inside wall of the bore 23 (FIG. 5). The tight engagement of the ridges 24 with the indentations 25 provides a first pivoting connection which permits the speaker to be held in place with minimal movement when the desired position has been achieved, but when a position change is desired, the speaker 12 may then be rotated about the shaft 22 with a sharp manual twist. The other end of the shaft 22 extends into the central opening 21 of the plate 20 (FIG. 4), and has a rim or ridge 26 which is slightly larger than the opening so that the end of the shaft is retained by the plate 20. This end of the shaft 22 is capable of rotation within the plate 20, permitting the speaker 12 to be moved pivotally about the mounting and providing a second pivoting connection. The plate 20 is also provided with holes for screws 27, as depicted in FIGS. 2, 3, and 4, so that the assembled mounting means may be mounted in the automobile interior above the windshield in the position provided for a conventional sun visor (FIG. 1).

The other speaker assembly 10b is essentially the same as the radio and speaker assembly 10a, except that the assembly 10b does not have a radio module 15. The assembly 10b thus functions as an external speaker. The radio module 15 may also be omitted from the assembly 10a if there is a radio or audio system provided elsewhere in the automobile, such as in the dashboard, and the speaker assemblies 10 of the present invention are intended for use as external speakers only.

While the radio module 15 is preferably a self-contained radio, it is possible that such a small radio may not provide the desired output. In such a case, the radio may be mounted elsewhere, such as in the dashboard, the glove compartment, or the trunk, and the module 15 may be used to contain simply the controls for the external radio or to contain an amplifier for the speaker 12. If the module 15 is used only for an amplifier, the control knobs 19 can be eliminated.

The radio and speaker assembly 10 is capable of the full range of adjustments associated with a conventional sun visor. The attachment of the shaft 22 to the plate 20 allows the speaker 12 to be moved horizontally, pivoting about its attachment point, between a position over the windshield 11 and a position above the side window, or any position in between. The tight rotatable connection between the ridges 24 and the indentations 25 allows the speaker 12 to be rotated on the shaft 22 and moved between a horizontal position against the interior roof and a vertical position extending downwardly.

To connect the radio module 15 to the automobile power supply and to the antenna or to connect the speaker 12 to an external automobile audio system located in the dashboard, wiring 29 extends from the acoustic panel 16 through a groove 30 to the bore 23. The speaker 12 must be modified to incorporate a groove 30 in one of the diagonal supports of the frame 17 so as to permit the wiring 29 to be connected from the bore 23 to the central acoustic panel 16. The wiring 29 extends through the hollow shaft 22 to the wall 31 of the automobile interior. A hole 32 is provided through the interior wall 31 coaxial with the central opening 21 in the plate 20. The wiring 29 may then be extended through the hole 32 and down inside the wall along the support beside the windshield 11 to the dashboard.

An additional catch 34 may also be provided extending from the corner of the speaker 12 on the opposite side from the shaft 22. The catch 34 is mounted in the speaker 12 in the same manner as the shaft 22 by providing a bore 35 in the speaker having annular indentations which engage corresponding ridges on one end of the catch 34. The catch 34 permits the free end of the radio and speaker assembly 10 to be secured above the windshield 11 to a latch 36 from which it may be readily detached manually. The catch 34 may also be secured to the speaker frame 17 by glue or some other adhesive.

In addition to providing a unique radio and speaker capable of a range of adjustable positions previously not possible with conventional speaker assemblies, the present invention does not sacrifice the benefits and advantages of conventional sun visors. It is clear that the radio and speaker assembly 10 may also be used as a sun visor and that the sun visor function is provided when it is not being used as a speaker and when it is used as a speaker. As a sun visor, the combination sun visor and radio and speaker assembly 10 may be adjusted as required to shield the eyes of the driver and/or the passenger from sunshine or glare. Due to the preferred bidirectional properties of the speaker 12, the radio and speaker assembly 10 may also be fully functional as a speaker regardless of its orientation as a sun visor.

In place of the single bidirectional speaker 12, a plurality of small, thin speakers may be mounted in a frame corresponding to the frame 17. The plurality of speakers would avoid the use of the specialized speaker 12, but would likely not produce the same quality of sound.

While a preferred form of this invention has been specifically illustrated and described herein, it will be apparent to those skilled in the art that modifications and improvements may be made to the forms herein specifically disclosed. Accordingly, the present invention is not to be limited to the forms herein specifically disclosed or in any other way inconsistent with the progress in the art promoted by this invention.

What is claimed is:

1. A combination automobile sun visor and speaker assembly comprising a thin bidirectional wafer-type speaker enclosed in a layer of acoustically transparent material to form an entire sun visor, the speaker comprising a lightweight acoustic panel supported by a frame, a module contained in the speaker, the module being connected to the speaker to drive the speaker, means for mounting the speaker above a windshield in place of a convenventional sun visor, the mounting means comprising a pivotable sun visor mounting assembly attached directly to the speaker, and wiring extending from the speaker for connection to an external power source.

2. A combination automobile sun visor and radio and speaker assembly comprising a thin speaker assembly enclosed in a layer of acoustically transparent material, a self-contained radio module contained in the speaker assembly, the module having external control means, the module being connected to the speaker assembly to drive the speakers, means for mounting the speaker assembly above the windshield, the mounting means comprising a pivotable sun visor mounting assembly, and wiring extending from the speaker assembly for connection to an external power source.

3. A combination automobile sun visor and speaker assembly as defined in claim 1, wherein the module is a control module used to control an external radio unit, the wiring connects the control module to the external radio unit and connects the radio unit to the speaker assembly, and the control module includes external control means.

4. A combination automobile sun visor and speaker assembly as defined in claim 2 or 3, wherein the external control means comprises control knobs projecting through the material.

5. A combination automobile sun visor and speaker assembly as defined in claim 1, wherein the module is an amplifier module which is connected to the speaker.

6. A combination automobile sun visor and radio and speaker assembly as defined in claim 1, wherein the module is enclosed in the material.

7. A combination automobile sun visor and speaker assembly as defined in claim 1 or 2, wherein the mounting means is hollow and the wiring extending from the speaker assembly extends through the hollow mounting means.

8. A combination automobile sun visor and speaker assembly as defined in claim 1 or 2, which when mounted on an automobile windshield in place of a customary sun visor provides shielding of the eyes from the sun to the degree provided by an automobile sun visor.

9. A combination automobile sun visor and speaker assembly as defined in claim 7, wherein the mounting means comprises a bore in the speaker assembly, a hollow tubular shaft one end of which engages the bore, and a plate having an opening holding the other end of the shaft, the wiring extending through the bore in the speaker assembly, through the hollow shaft, and through the opening in the plate, and being capable of extending down along the side of the windshield.

10. A combination automobile sun visor and speaker assembly as defined in claim 1 or 2, wherein the mounting means has a first pivoting connection allowing the speaker assembly to be tilted freely between a horizontal position and a vertical position to permit both shielding of the eyes from the sun and substantial redirection of sound.

11. A combination automobile sun visor and speaker assembly as defined in claim 10, wherein the mounting means has a first pivoting connection comprising a hollow shaft having a series of raised ridges, the speaker assembly having a bore for the shaft, the inside walls of the bore having indentations for the ridges, the ridges engaging the indentations to hold the speaker assembly in place with minimal movement.

12. A combination automobile sun visor and speaker assembly as defined in claim 10, wherein the mounting means has a second pivoting connection allowing the speaker assembly to be freely laterally rotated to permit both shielding of the eyes from the sun and substantial redirection of sound.

13. A combination automobile sun visor and speaker assembly as defined in claim 12, wherein second pivoting connection comprises a hollow shaft having a rim at one end, a plate adapted to be mounted to the automobile interior, and a central opening for the shaft, the plate around the central opening engaging the rim on the shaft to hold the speaker in place with minimal movement.

14. A combination automobile sun visor and speaker assembly as defined in claim 1 or 2, comprising in addition a catch attached on one side of the speaker assembly opposite the mounting means and capable of engaging a latch on the automobile interior to secure the speaker assembly.

* * * * *

UNITED STATES PATENT AND TRADEMARK OFFICE
CERTIFICATE OF CORRECTION

PATENT NO. : 4,362,907

DATED : December 7, 1982

INVENTOR(S) : David D. Polacsek

It is certified that error appears in the above—identified patent and that said Letters Patent is hereby corrected as shown below:

Column 6, line 10, "and radio" should be deleted.

Signed and Sealed this

Twenty-second Day of March 1983

[SEAL]

Attest:

GERALD J. MOSSINGHOFF

Attesting Officer          Commissioner of Patents and Trademarks